(12) United States Patent
Messinger et al.

(10) Patent No.: US 6,687,750 B1
(45) Date of Patent: Feb. 3, 2004

(54) NETWORK TRAFFIC VISUALIZATION

(75) Inventors: Fred Messinger, Groton, MA (US); George Swallow, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/291,381

(22) Filed: Apr. 14, 1999

(51) Int. Cl.[7] ............................................. G06F 15/173
(52) U.S. Cl. ....................... 709/224; 709/202; 709/217; 709/223; 709/229; 713/201; 703/6; 714/47
(58) Field of Search ........................ 345/335; 368/113; 395/770, 779; 379/88.22; 709/101, 224, 202, 229, 223, 217; 714/47; 703/6; 713/201

(56) References Cited

U.S. PATENT DOCUMENTS

| | | | | |
|---|---|---|---|---|
| 4,471,348 A | * | 9/1984 | London et al. ................. 345/2 |
| 5,276,789 A | * | 1/1994 | Besaw et al. ................ 395/140 |
| 5,295,244 A | * | 3/1994 | Dev et al. .................... 345/357 |
| 5,349,662 A | * | 9/1994 | Johnson et al. ............. 395/700 |
| 5,471,616 A | * | 11/1995 | Johnson et al. ............. 395/700 |
| 5,559,955 A | * | 9/1996 | Dev et al. ....................... 714/4 |
| 5,570,326 A | * | 10/1996 | Trystram .................... 368/113 |
| 5,659,768 A | * | 8/1997 | Forbes et al. ............... 395/779 |
| 5,751,965 A | * | 5/1998 | Mayo et al. ................. 709/224 |
| 5,768,552 A | * | 6/1998 | Jacoby ........................ 345/334 |
| 5,793,974 A | * | 8/1998 | Messinger .................. 709/224 |
| 5,850,386 A | * | 12/1998 | Anderson et al. ........... 370/241 |
| 5,850,388 A | * | 12/1998 | Anderson et al. ........... 370/252 |
| 5,878,420 A | * | 3/1999 | Salle ............................ 707/10 |
| 6,054,987 A | * | 4/2000 | Richardson ................. 345/348 |
| 6,065,138 A | * | 5/2000 | Gould et al. ................... 714/47 |
| 6,104,392 A | * | 8/2000 | Shaw et al. ................. 345/335 |
| 6,122,639 A | | 9/2000 | Babu et al. |
| 6,144,987 A | | 11/2000 | Niemi |
| 6,219,708 B1 | * | 4/2001 | Martenson ................... 709/226 |
| 6,252,947 B1 | * | 6/2001 | Diamond et al. ......... 379/88.22 |
| 6,269,447 B1 | * | 7/2001 | Maloney et al. ............ 713/201 |
| 6,271,845 B1 | * | 8/2001 | Richardson ................. 345/356 |
| 6,279,037 B1 | * | 8/2001 | Tams et al. ................. 709/224 |
| 6,281,790 B1 | * | 8/2001 | Kimmel et al. ............. 340/506 |
| 6,289,368 B1 | * | 9/2001 | Dentler et al. .............. 709/101 |
| 6,295,527 B1 | | 9/2001 | McCormack et al. |
| 6,304,262 B1 | * | 10/2001 | Maloney et al. ............ 345/418 |
| 6,308,148 B1 | | 10/2001 | Bruins et al. |
| 6,327,620 B1 | * | 12/2001 | Tams et al. ................. 709/224 |

\* cited by examiner

*Primary Examiner*—Hosain Alam
*Assistant Examiner*—Thu Ha Nguyen
(74) *Attorney, Agent, or Firm*—Cesari and McKenna, LLP

(57) ABSTRACT

A system containing a visualization application which enables the user or other user to obtain information about various types of transactions involving the respective activities of the components. The user selects filtering criteria that identify various types of transactions performed on each network component from the visualization application and the visualization application uses these criteria in compiling the appropriate records from the network information files. The visualization application then forms the data that represent the records that meet each selected criterion and stores the data in a local file. Thereafter, the user may view the network activity through the visualization application which displays a map of the network and overlays the map with graphical moving images that represent the data for each selected criterion. The graphical images change with time to reflect changes in the underlying data.

34 Claims, 4 Drawing Sheets

NETWORK TRAFFIC VISUALIZATION

FIELD OF THE INVENTION

This invention relates to network management applications that assemble network information, and specifically to a visualization application that displays network traffic information assembled by the network management applications.

BACKGROUND OF THE INVENTION

Distributed computer networks, to which this invention applies, are systems comprising a number of components such as printers, computers, routers and the like, that are interconnected to enable communication among the components and sharing of data and resources. For example, a distributed computer network may include a combination of separate local area networks (LAN) that are connected in a wide area network (WAN) to form a single distributed network structure. The LANs are interconnected to communicate with each other by routers. Each LAN may include servers and clients that are connected by physical media such as cables and network cards in order to share resources such as files or applications. A server may be a computer or process that provides shared network resources to network users and a client is usually a computer that accesses the shared network resources provided by the servers. Shared resources in a network may include printers, other peripherals and software applications.

Network activity information relating to messages transmitted over the network is commonly stored in designated network information files on one or more of the network's computers. As activity information is received from the various network components, it is appended to these files. Records in the files are time stamped to indicate when they were received. The information files thus maintain a record of all activities over the network over some period of time.

In order to view the network activity for a particular computer or group of computers, facilities are commonly provided to retrieve selected data for examination by the user. Such data may include, for example, the amount of traffic into or out of a particular resource in the system; a record of particular kinds of traffic; the identity of traffic originators, etc. Typically, the data is presented in tabular form, and the amount of data can be overwhelming. Thus, it is often difficult to assimilate the data presented. In order to facilitate assimilation of the data, the amount of data may be selectively reduced in volume, but this correspondingly diminishes the information that can be gleaned from it. Most often, such a reduction involves selecting a subset of the data based on the source and/or destination of the data. While such views are interesting in and of themselves, they fail to present a comprehensive, gestalt view of the network

SUMMARY OF THE INVENTION

We have created a visualization application which enables a user such as a system administrator to rapidly obtain and assimilate substantial amounts of information about various types of transactions involving the respective activities of the components. In particular, in accordance with the present invention, information concerning various aspects of network traffic is monitored and stored for subsequent retrieval and use. For example, the information may be collected by one or more routers through which the data passes as it transits the network, and stored in a separate file from which it is subsequently retrieved for display.

The user may select for display specific subsets of the collected information, as well as specific attributes of these subsets. The criteria for specifying the data may include, among other elements, the identification of particular components whose activity is to be monitored; the starting and ending times of the interval over which the information is to be monitored for subsequent display; the frequency within the interval at which the information is to be monitored and the duration of the monitoring at each instance (e.g., for a twenty-four hour interval, a monitoring period of one minute at every ten minutes); and other pertinent characteristics. The network visualization application begins extracting data from the network information files at the starting time and stops extracting data at the ending time. During each intermediate time interval, the visualization application compiles the information in the information file that meets the filtering criteria set forth by the system administrator, and stores the selected information for display at stated times or at the request of the administrator.

The visualization application displays a map of the network and dynamically overlays the map with graphical images that represent the selected information designated by the system administrator or other user. The information is presented in a dynamic, graphic (as opposed to numeric) manner that the user can quickly assimilate. For example, traffic between selected computers may be represented by lines whose width, color, density or other characteristic changes in accordance with the volume of traffic over time. By taking "snapshots" of this traffic at discrete intervals over a larger interval, one effectively forms "frames" that depict the traffic at various times and that, when is played back one after the other in rapid succession, create a "movie clip" of the selected traffic flow parameters. This provides an environment in which the system administrator or other user can accurately and visually analyze the composition of network activity and thereby reduce human errors that occur during interpretation of static data tables that heretofore have been relied upon for presentation of network information.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 4-B depicts a subset of FIG. 1 and a graphical image of the network activities between selected components on LAN 101 at time $t_2$;

FIG. 4-C depicts a subset of FIG. 1 and a graphical image of the network activities between selected components on LAN 101 at time $t_3$; and FIG. 4-D depicts a subset of FIG. 1 and a graphical image of the network activities between selected components on LAN 101 at time $t_4$.

DETAILED DESCRIPTION OF AN ILLUSTRATIVE EMBODIMENT

Figure 1:
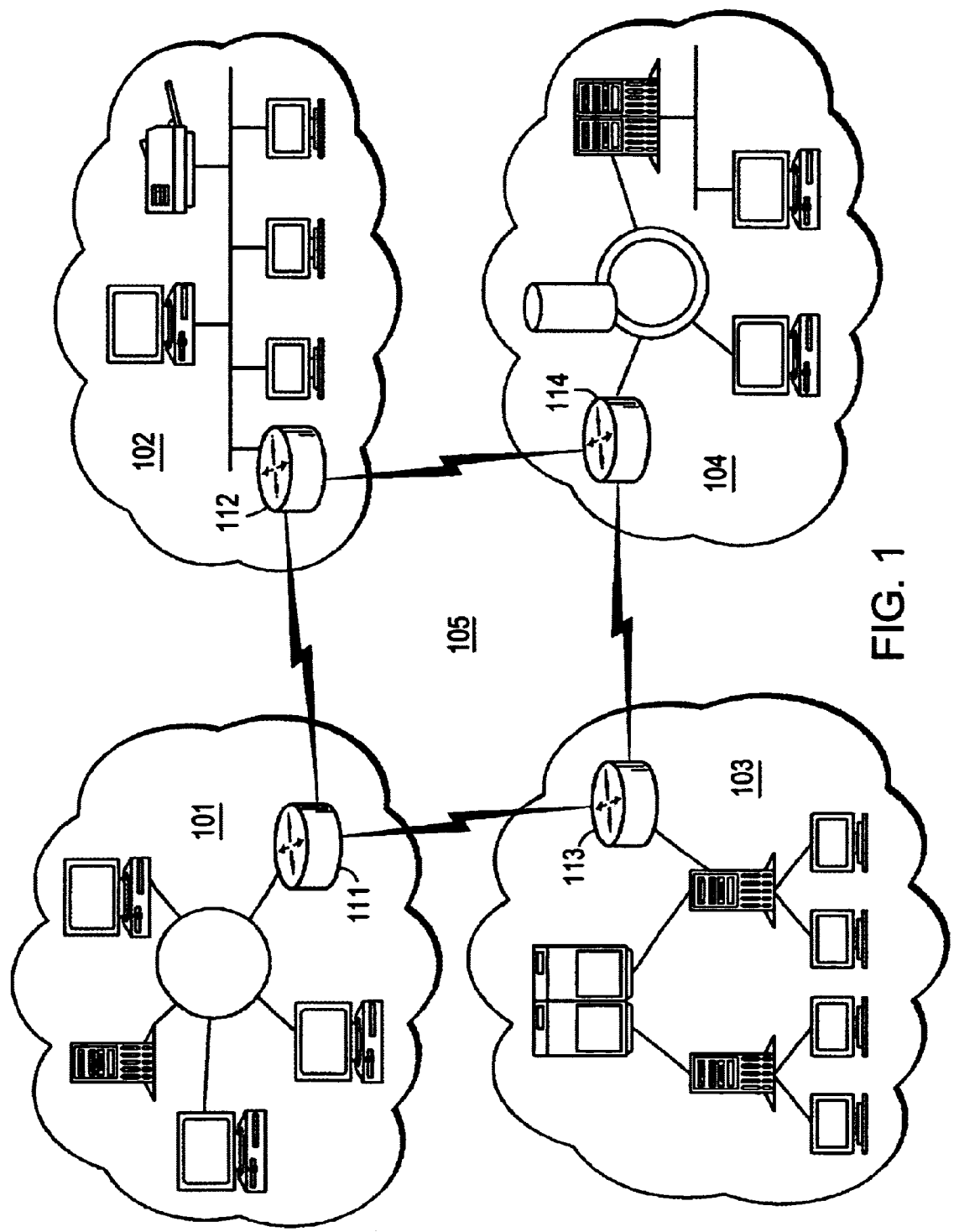
FIG. 1 is a diagram of a network management system incorporating the invention.

FIG. 1 is a schematic diagram of a distributed network management system that is configured to share resources and data in accordance with the present invention. The illustrated system is a combination of four separate local area networks (LAN) 101–104 that are interconnected into a wide area network (WAN) 105 to form a single distributed network structure. Each LAN 101–104 may include servers and clients that are connected by physical media such as cables and network cards in order to share resources such as files or applications. A server may be a computer or process that provides shared network resources to network users, and a client may be a computer or process that accesses the shared network resources provided by the servers. Shared resources in a network may include printers and other peripherals, as well as software applications. The LANs 101–104 are interconnected to communicate with each other by routers 111–114. The routers exchange protocol-specific information between separate networks and determine the best path for sending data.

In order to effectively manage a distributed network system, the system administrator or other user must monitor network activity. Timely and accurate information about the states of each network component and the activities performed on each component is required for the system administrator to perform the necessary network management functions. Therefore, the states of these network components are consistently monitored by a reporting structure which records the component's states and each network activity performed on those components.

Figure 2:
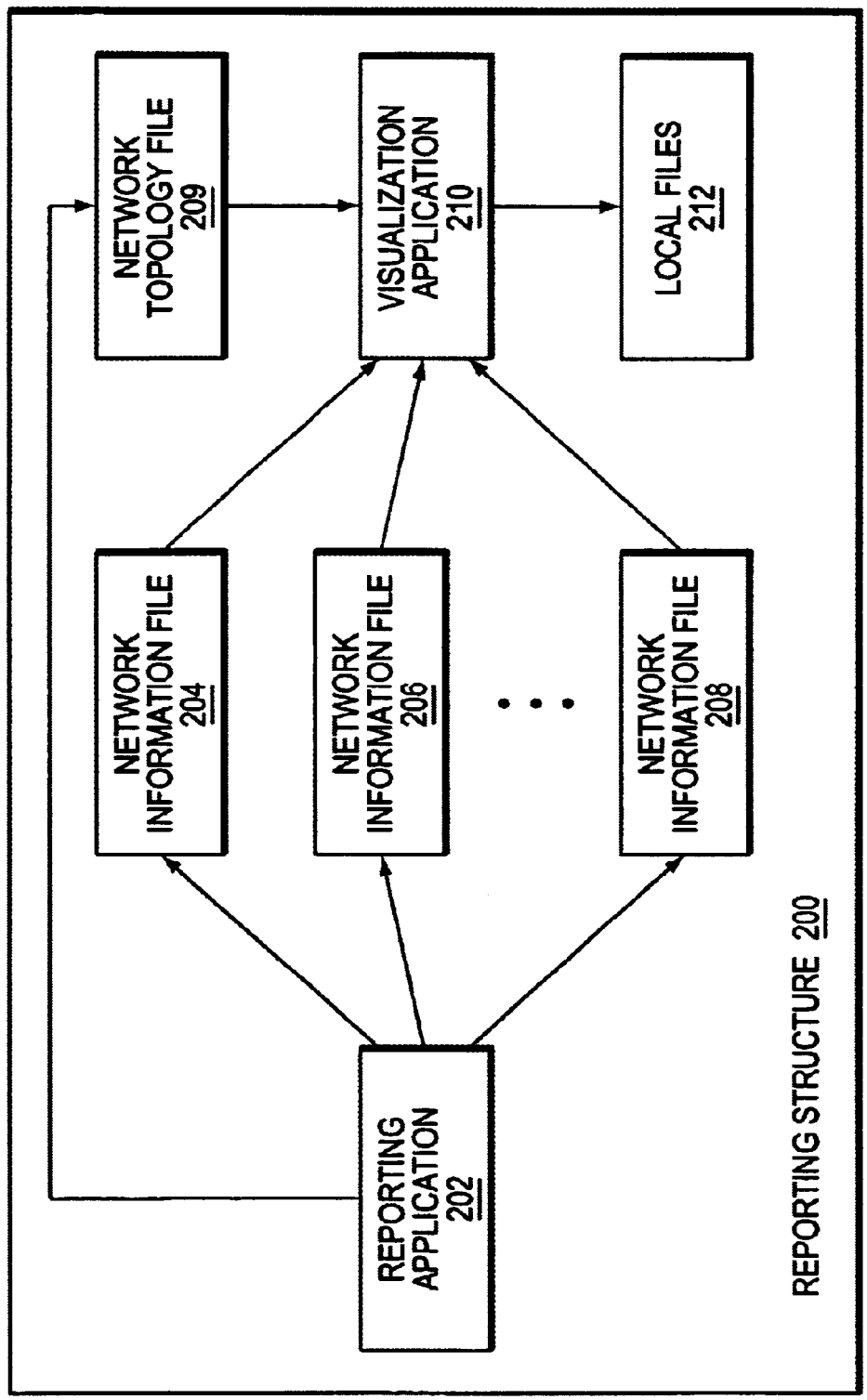
FIG. 2 is a schematic diagram of the network reporting structure and how they interact with each other.

The illustrative reporting structure 200 shown in FIG. 2 may reside in any location on the network. It includes a reporting application 202, three network information files 204–208 stored in one or more locations on the network, a network topology file, 209, and a visualization application 210 for extracting information from the network information files 204–208 and graphically displaying the information to the system administrator. The reporting application 202 constantly monitors the state of each network component and appends the results to the appropriate network information file 204–208. It also receives a record of each network activity and appends those to the information files 204–208. The records in the network information files 204–208 are time stamped to indicate when each record was generated. While the recording of network activity may be performed by a single reporting application 202, this task can also be performed without a reporting application. Each of the network components can append its state and activities directly to the appropriate network information files 204–208. The network files 204–208 are typically monitored and backed up by the system administrator and information in those files 204–208 may be deleted at the system administrator's discretion. The network topology file 209 records and stores the topology of the network at the times the network information files are generated.

In accordance with the present invention, after the network starts up, the user manually executes the visualization application 210 and uses the graphical user interface in the application to create filtering expressions for extracting the desired information from the network information files 204–208. The visualization application enables the user to obtain information about the overall network activities; to obtain information about activities between two or more network components; and to obtain information about each transaction performed on each network component. The user selects the appropriate filtering criteria from the graphical user interface associated with the visualization application 210. Based on the selected filtering criteria, the visualization application 210 selects the relevant data with the correct time stamp from the network information files 204–208, executes the filtering expression on selected data, calculates parameters that are associated with the selected data, and stores the calculated parameters in a local file 212. The topology of the network corresponding to this data is associated with it either directly in local file 212 or through links to the network topology file 209. Subsequently, when the user views the selected data through the visualization application 210, the visualization application 210 exhibits a map of the network and graphically displays the generated parameters through representational moving images that change with time to thereby represent changes in the underlying parameters as a function of time. Examples of representational moving images used by the visualization application 210 to display the generated parameters may include black and white or colored arrows, bar charts, graphs and other representational indicia whose length, width, density, color, or other visual or sensory characteristics vary in accordance with the desired parameters to be representationally displayed.

An example of a parameter of interest might be the number of log-in attempts made from a particular computer to others, or made to one or more computers in the network. These attempts may appropriately be represented by arrows directed from the computer of interest to the other computers in the network, or simply directed to the other computers, as the case may be. The arrows are shown in a dynamic fashion, e.g., as short directed segments traversing a portion of the screen during the display interval from or to one or more computers to indicate the "probing" nature of the log-in. The log in rate, i.e., the number of attempted log-ins during a given time interval, may be represented by the rate at which the arrow traverses the screen, or by the width or the arrow, or by the color, intensity or other changeable characteristic of the arrow or other representational element. The user may advantageously select the desired representational characteristics for the specified parameters, or they may be determined by default in the visualization application.

The visualization application 210 preferably maintains the selected files in the local files until the user decides to delete them. This enables the user to review the results from the reporting structure until the results are no longer needed.

Figure 3:
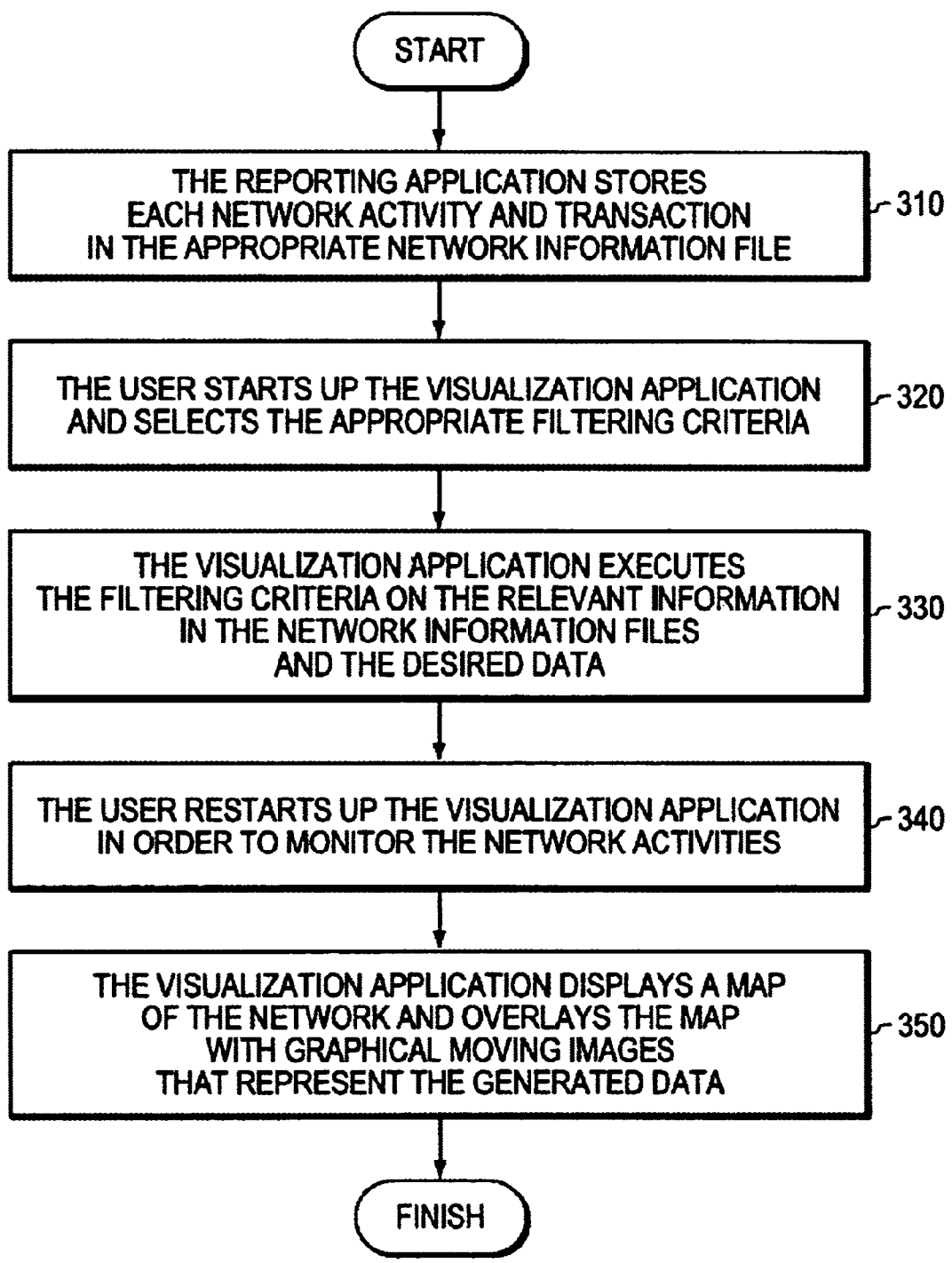
FIG. 3 is an example of the steps performed by the network reporting structure in order to display the composition of network traffic to the user.
Figure 4C:
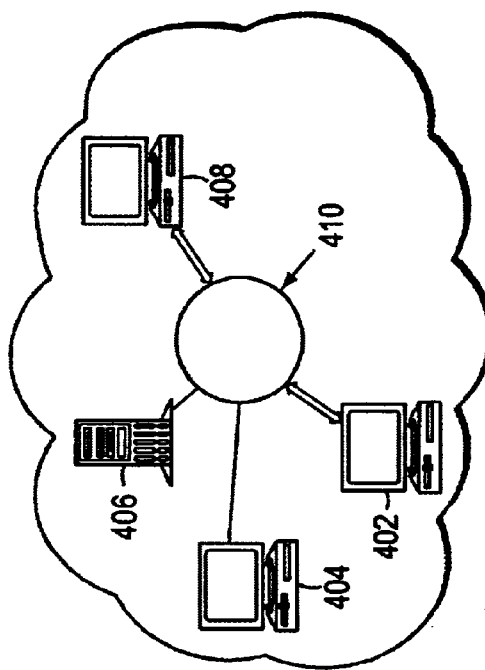
FIG. 4-A depicts a subset of FIG. 1 and a graphical image of the network activities between selected components on LAN 101 at time $t_1$.
Figure 4D:
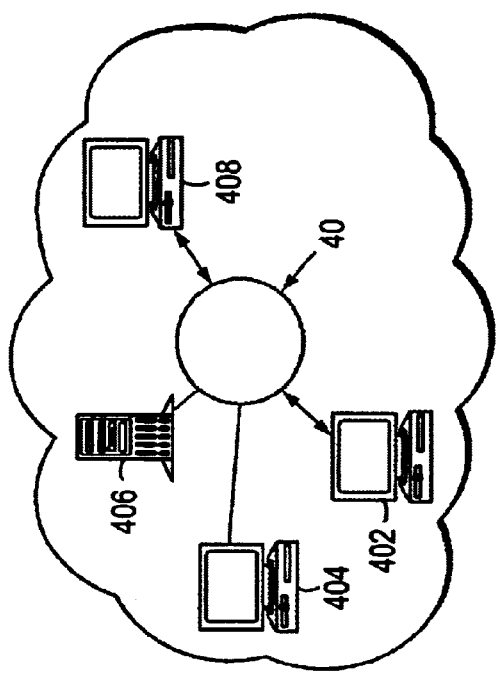
Figure 4A:
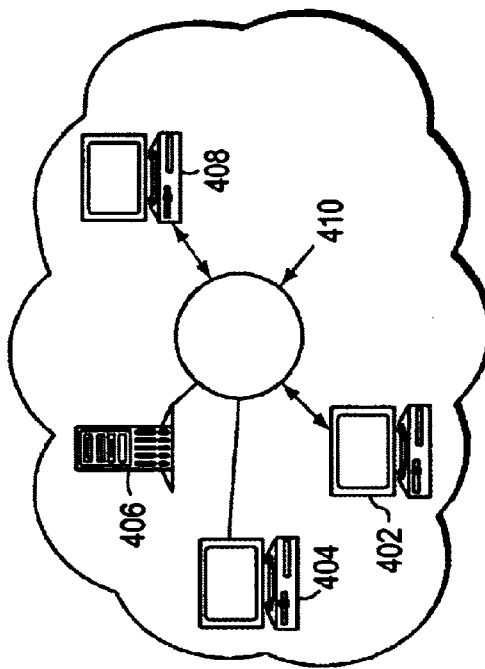
Figure 4B:
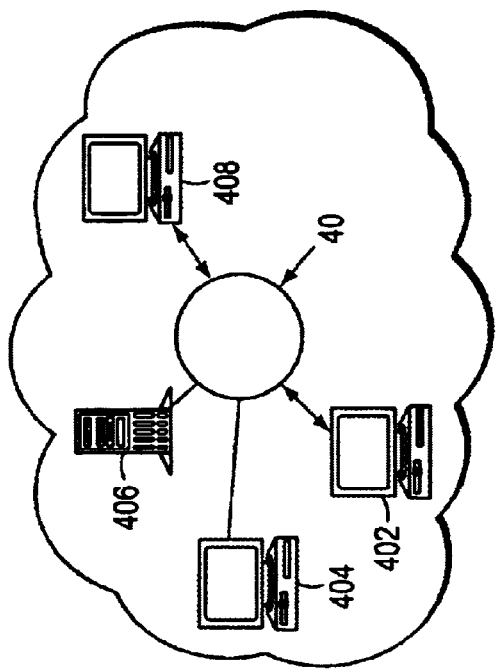

FIG. 3 is an example illustrating the steps performed by the reporting structure 202 in order to generate a graphical display for the system operator. For example, if a "hacker", i.e., an unauthorized user, tries to obtain access to one or more computers on the network, the data in the reporting structure 200 accurately reports such information to the system operator in the following steps. In Step 310, the reporting application stores each log-in transaction performed by the hacker in the appropriate information files 204–208. Thus, for example, if the hacker uses the same user name with an excessive number of different passwords while trying to gain access to a single computer, the reporting structure will record each log-in transaction with each of the different passwords. As another example, if the hacker uses the same user name/password while trying to gain access to a number of different computers in the network, a record of each log-in transaction on each computer will be stored in the appropriate information files 204–208. During the network monitoring, the system operator or other user of the visualization application will be able to trace the changes in the destination computer by the hacker.

In Step 320, the user starts up the visualization application 210 and uses the graphical user interface in the visualization application to create filtering expressions for extracting the desired information from the network information files 204–208. The user selects the appropriate filtering criteria from the graphical user interface associated with the visualization application 210. In Step 330, the visualization application 210 selects the relevant data from the network information files 204–208; executes the filtering expression on selected data and stores the filtered data in a local file. In Step 340, the user restarts the visualization application 210 in order to monitor the network activities. In Step 350, the visualization application 210 displays a map of the network and overlays the map with a graphical display of dynamically changing images that represent the selected data over the selected time period.

FIGS. 4-A to 4-D further illustrate how information is displayed to the system operator through the visualization application 210. FIGS. 4-A to 4-D depict a subset of FIG. 1, each figure displaying LAN 101 and representational images of the network activities between selected components on LAN 101. According to the invention, the user may choose to view the activities on or between any network components. For instance, the user may choose to observe the network activities between components 402 and 408 passing through switch 410 FIGS. 4-A to 4-D and thus portray network activities between components 402 and 408 for a selected period of time.

In particular, after selecting the appropriate information from the information files and generating the data corresponding with the selected information, the visualization application 210 displays a map of the network. In this case, the visualization application displays a subset of the network that depicts LAN 101. The visualization application 210 then dynamically overlays the map with graphical images that symbolize the generated data. In FIGS. 4-A to 4-D, double sided arrows are used as the graphical images. At time $t_1$, the visualization application 210 displays medium width, double sided arrows between components 402 to 408, as shown in FIG. 4-A. This portrays a moderate amount network traffic between these network components during the time subinterval corresponding to $t_1$. At time $t_2$, FIG. 4-B, the arrows between components 402 and 408 have a smaller width to graphically illustrate less network traffic. At time $t_3$, FIG. 4-C, the arrows between these components are considerably thicker and graphically denote more network traffic than at times $t_1$ and $t_2$; finally, at time $t_4$, FIG. 4-D, the arrows between computers 402 and 408 are again narrower, thus depicting a moderate amount of network activities between components 402 and 408. FIGS. 4-A to 4-D therefore give the user a visual, dynamic display of the network activities that is instantly assimilable and that does not require the user to analyze massive amounts of data in static tables.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A data visualization system for graphically presenting characteristics of data traffic on a distributed computer network system comprising:
   A) means for monitoring traffic on said system;
   B) means for selecting characteristics of said traffic for display;
   C) means for presenting said characteristics in a graphical format, said graphical format representing said system in response to said monitoring, said system represented as nodes connected by lines, said lines representing traffic flow between nodes,
   D) means for displaying a width of a line of said lines, said width indicating a value of said characteristics, said value obtained from said monitoring during a selected time interval; and
   E) means for displaying a sequence of said images, each of said images taken during a different time interval, and changes in said width of said line showing changes in said characteristics.

2. The system of claim 1 wherein the means for monitoring comprises:
   a reporting structure which records in network information files the states of network components and activities performed on the components over a period of time.

3. The system of claim 1 wherein the means for selecting further comprises:
   A) means for displaying a graphical user interface in the data visualization system to select filtering expressions for extracting information from network information files;
   B) means for selecting the relevant records from network information files;
   C) means for executing the selected filtering expression on the selected records; and
   D) means for calculating parameters that are associated with the selected records and storing said parameters in a local file.

4. The system of claim 3 wherein the graphical format may be any graphical black and white or color image capable of being displayed on the data visualization system.

5. A distributed computer network system comprising:
   A) a plurality of network components that generate and transmit records to network information files upon performing each network activity;
   B) at least one visualization application generating at least one filtering program, each filtering program displaying filtering criteria including various types of transactions associated with the respective activities of the network components;
   C) means for selecting the desired filtering criteria from the visualization application; and
   D) means for generating data representing records in the network information files that meet each selected filtering criterion and dynamically displaying graphical images that represent the generated data;
   E) means for presenting said graphical images to represent said network as nodes connected by lines, said lines representing traffic flow between nodes;
   F) means for displaying a width of a line of said lines, said width indicating a value of said characteristics, said value obtained from said monitoring during a selected time interval; and
   G) means for displaying a sequence of said images, each of said images taken during a different time interval, and changes in said width of said line showing changes in said characteristics.

6. The system of claim 5 wherein the visualization application uses the filtering program to select the records in the network information files that meet the selected filtering criteria.

7. The system of claim 6 wherein the visualization application compiles the appropriate records from the network information files during specified intermediate time intervals, each compiled record meeting at least one selected filtering criterion.

8. The system of claim 7 wherein the visualization application calculates data that represent the compiled records and stores the data in a local file.

9. The system of claim 8 wherein the visualization application displays a map of the network topology and overlays the map with moving images that graphically portray the stored data, said moving images changing with time to reflect changes in the underlying data during a period of time selected by a system operator.

10. The system of claim 9 wherein the filtering criteria in the visualization application includes an intermediate time interval criterion which indicates how often the visualization application should compile and package information form the network information files.

11. The system of claim 10 wherein the visualization application graphically displays the network activity for any period within the starting and ending times specified within the filtering criteria.

12. A method for graphically displaying the activities between network components and the composition of transactions that makes up certain network activities in a computer network, the method comprising the steps of:
  A) transmitting to network information files records from a plurality of network components upon performing each network activity;
  B) displaying filtering criteria from at least one filtering program in a visualization application, the filtering program including the various types of transactions associated with respective activities of the network components;
  C) selecting the desired filtering criteria from the visualization application;
  D) filtering records in the network information files based on the selected filtering criteria;
  E) generating data representing records in the network information files that meet each selected filtering criterion; and
  F) presenting the generated data as images, said images representing said network in response to said filtering, said network represented as nodes connected by lines, said lines representing traffic flow between nodes;
  G) displaying a width of a line of said lines, said width indicating a value of said characteristics, said value obtained from said monitoring during a selected time interval; and
  H) means for displaying a sequence of said images, each of said images taken during a different time interval, and changes in said width of said line showing changes in said characteristics.

13. The method of claim 12 wherein the step C of selecting comprises the step C1 of choosing the desired network components, transaction types and the starting and ending times for filtering records from the network information files.

14. The method of claim 12 wherein the step D of filtering comprises the step D1 of compiling the appropriate records from the network information files that meet the chosen filtering criteria.

15. The method of claim 12 wherein the step E of generating comprises the steps of:
  E1. calculating data that represent records in the network information file that meet each selected criterion; and
  E2. storing the data in a local file.

16. A data visualization system comprising:
  A) means for monitoring traffic on a distributed computer network system;
  B) means for pre-selecting characteristics of said traffic, performing computations on traffic data, and storing computed results for subsequent graphical display;
  C) means for presenting said characteristics in a graphical format, said graphical format representing said system in response to said monitoring, said system represented as nodes connected by lines, said lines representing traffic flow between nodes;
  D) means for displaying a width of a line of said lines, said width indicating a value of said characteristics, said value obtained from said monitoring during a selected time interval; and
  E) means for displaying a sequence of said images, each of said images taken during a different time interval, and changes in said width of said line showing changes in said characteristics.

17. The system of claim 16 further comprises a reporting structure which records in network information files the states of network components and traffic related activities performed by the components over a period of time.

18. The system of claim 16 wherein said means for pre-selecting further comprises:
  A) a graphical user interface to select filtering expressions for extracting information from network information files;
  B) means for selecting the relevant records from network information files;
  C) means for executing the selected filtering expression on the selected records; and
  D) means for calculating parameters that are associated with the selected records and storing said parameters in a local file.

19. The system of claim 18 further comprises a moving image, which may be any graphical black and white or color and may be capable of being displayed on said system.

20. A distributed computer network system comprising:
  A) a plurality of network components that generate and transmit records of their network activity to network information files;
  B) at least one visualization application generating at least one filtering program, each filtering program displaying the filtering criteria, which includes various types of transactions associated with the respective activities of each network component;
  C) means for selecting the desired filtering criteria for the visualization application
  D) means for generating data representing records in the network information files that meet each selected filtering criterion;
  E) means for presenting said data in a graphical format, said graphical format representing said system in response to said filtering, said system represented as nodes connected by lines, said lines representing traffic flow between nodes;
  F) means for displaying a width of a line of said lines, said width indicating a value of said characteristics, said value obtained from said monitoring during a selected time interval; and
  G) means for displaying a sequence of said images, each of said images taken during a different time interval, and changes in said width of said line showing changes in said characteristics .

21. The system of claim 20 wherein the visualization application further comprises said filtering program to select the records in the network information files that meet the selected filtering criteria.

22. The system of claim 21 wherein the visualization application further comprises means for compiling the appropriate records from the network information files during specified intermediate time intervals, each compiled record meeting at least one selected filtering criterion.

23. The system of claim 22 wherein the visualization application further comprises means for calculating data that represent the compiled records and stores the data in a local file.

24. The system of claim 23 wherein the visualization application further comprises means for displaying a map of the network topology and overlaying the map with moving images that graphically portray the stored data, said moving images changing with time to reflect changes in the underlying data during a period of time selected by a system operator.

25. The system of claim 24 wherein the filtering criteria in the visualization application further comprises an intermediate time interval criterion which indicates how often the visualization application should compile and package information form the network information files.

26. The system of claim 24 wherein the visualization application further comprises means for graphically displaying the network activity for any period within the starting and ending times specified within the filtering criteria.

27. A method for graphically displaying network traffic comprising the steps of:
   A) monitoring traffic on a distributed computer network system;
   B) pre-selecting characteristics of said traffic, performing computations on traffic data, and storing computed results for subsequent graphical display; and
   C) presenting said characteristics in a graphical format, said graphical format representing said system in response to said monitoring, said system represented as nodes connected by lines, said lines representing traffic flow between nodes;
   D) means for displaying a width of a line of said lines, said width indicating a value of said characteristics, said value obtained from said monitoring during a selected time interval; and
   E) means for displaying a sequence of said images, each of said images taken during a different time interval, and changes in said width of said line showing changes in said characteristics.

28. The method of claim 27 wherein said step of monitoring further comprises the step of recording in network information files the states of network components and traffic related activities performed by the network components over a period of time.

29. The method of claim 27 wherein said step of pre-selecting further comprises the steps of:
   A) selecting filtering expressions for extracting information from network information files;
   B) selecting the relevant records from network information files;
   C) executing the selected filtering expression on the selected records; and
   D) calculating parameters that are associated with the selected records and storing said parameters in a local file.

30. The method of claim 29 further comprises a step of displaying at least one moving image, which may be any graphical black and white or color.

31. A method for displaying traffic on a computer network, comprising:
   monitoring traffic by a node, said node sending results of said monitoring to network information files stored on a first computer;
   selecting characteristics of said traffic for display by a second computer, said first computer sending data to said second computer; and
   displaying, in response to said data, said selected characteristics by said second computer;
   presenting said characteristics in a graphical format, said graphical format representing said system in response to said monitoring, said system represented as nodes connected by lines, said lines representing traffic flow between nodes;
   displaying a width of a line of said lines, said width indicating a value of said characteristics, said value obtained from said monitoring during a selected time interval; and
   displaying a sequence of said images, each of said images taken during a different time interval, and changes in said width of said line showing changes in said characteristics.

32. The method of claim 31, further comprising:
   choosing said first computer and said second computer as the same computer.

33. A computer readable medium, comprising
   said computer readable medium containing instructions for execution in a processor for the practice of the method of claim 12, or claim 27, or claim 31.

34. Electromagnetic signals propagating on a computer network, comprising:
   said electromagnetic signals carrying instructions for execution on a processor for the practice of the method of claim 12, or claim 27, or claim 31.

* * * * *